M. JINCKS.
Fish-Spear.
No. 168,335. Patented Oct. 5, 1875.
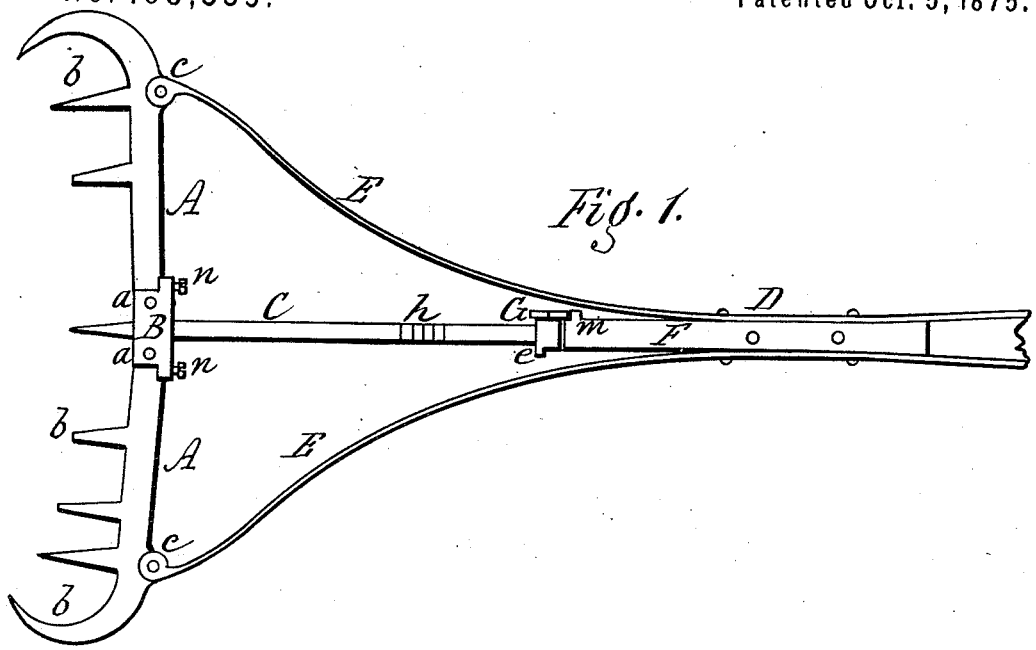
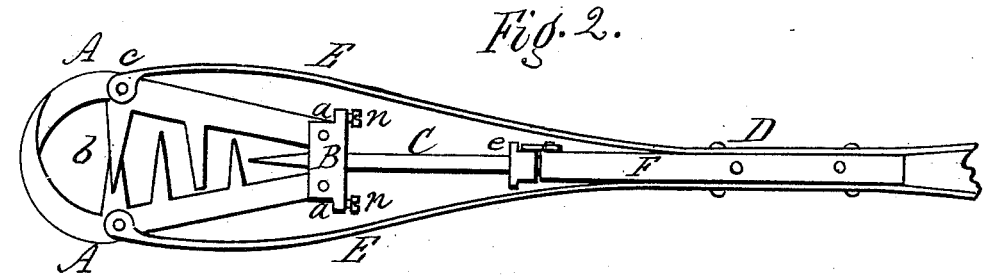
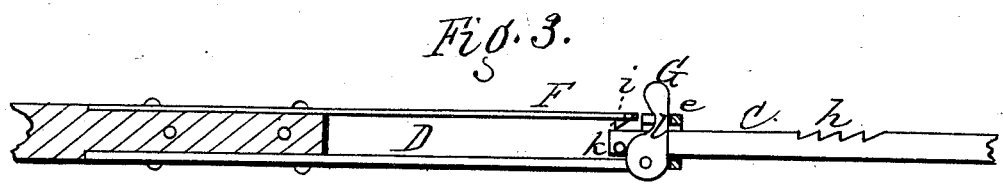
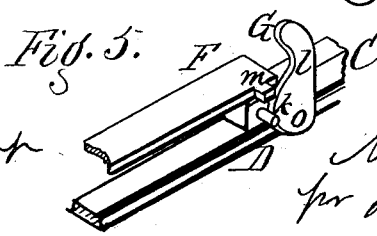
Witnesses.
Edwin D. Scott
Jacob Spahn
Inventor.
Melvin Jincks,
per R. F. Osgood,
Atty.

UNITED STATES PATENT OFFICE.

MELVIN JINCKS, OF WALLACE, NEW YORK.

IMPROVEMENT IN FISH-SPEARS.

Specification forming part of Letters Patent No. 168,335, dated October 5, 1875; application filed March 16, 1875.

*To all whom it may concern:*

Be it known that I, MELVIN JINCKS, of Wallace, in the county of Steuben and State of New York, have invented a certain new and useful Improvement in Fish-Spears; and I do hereby declare that the following is a full, clear, and exact description of the construction and operation of the same, reference being had to the accompanying drawings, in which—

Figure 1 is a plan, showing the spear set open for use. Fig. 2 is a similar view, showing the grappling-jaws closed. Fig. 3 is a longitudinal section corresponding with Fig. 1. Fig. 4 is a similar view corresponding with Fig. 2. Fig. 5 is a perspective view, showing the cam and connecting parts.

This improvement relates to fish-spears having spring-jaws, which are set open for use, and are sprung by striking the fish.

The invention consists in the combination, with the grappling-jaws, of a central sliding shaft, which forms the guide, the same being notched or toothed upon its upper surface, and operating in conjunction with a spring-catch to hold the jaws closed upon the fish when caught. It also consists in the combination, with the sliding shaft and spring-catch, of a cam and stop-pin, as hereinafter described.

A A represent the two grappling-jaws, which are pivoted at $a$ $a$ to a head, B, attached fast to a central shaft or rod, C. This shaft slides back through a head, $e$, and within a socket, D, at the end of the handle. The jaws have barbs $b$ $b$ projecting outward, and so arranged as to strike one over another when the jaws are closed. The outer barbs are preferably curved, as shown. To the outer ends of the jaws are pivoted springs E E attached to the handle. When the jaws are opened, as in Fig. 1, the central shaft C slides outward, and is set in that position by reason of the pivots $c$ $c$ of the springs standing a little back or out of the line with the central pivots $a$ $a$; but when the thrust is made the shaft C is driven back, and the toggle of the levers closing causes the jaws to spring together with great power, thereby catching upon and holding the fish. The upper surface of the shaft is provided with ratchet-teeth $h$, and the spring F in the rear has upon its front end a corresponding inclined catch, $i$. When the jaws are sprung the catch and teeth come in coincidence and engage together, thereby preventing the jaws from opening under the contortions of the fish. G is a cam, pivoted to the bottom of the socket D. $k$ is a pin projecting from the rear end of the shaft C. When the jaws are opened the end motion of the shaft causes the pin to strike the cam and press it forward into the position shown in Figs. 3 and 5. The cam is provided with an indentation, $l$, which, when thrown back, as in Fig. 4, strikes under a lug, $m$, projecting from the side of the spring F, and raises the same so as to disengage the catch $i$ from the teeth $h$, thereby allowing the jaws to be opened. The cam, therefore, plays between the lug $m$ and pin $k$, serving to raise the catch to allow the jaws to open to set the spear, and then being released to allow the catch to act again by the automatic movement produced by the opening of the jaws.

If desired to spring the jaws without striking, a cord might be attached to the shaft C extending upward to the hands of the operator.

$n$ $n$ are set-screws passing through the head B and resting against the jaws A A. By turning these screws in or out, the jaws may be set more or less angular, thereby increasing or diminishing the power necessary to apply in springing the jaws.

The central shaft C serves an important purpose in centering and holding the jaws in position in springing, which is accomplished by resting and sliding in the rear bearing $e$. It also serves an important purpose in locking the jaws when closed upon the fish, which is accomplished by means of the teeth $h$ and spring-catch F.

The cam G is necessary to raise the spring-catch F from its engagement with the teeth $h$, to allow the jaws to be opened, and the pin $k$ serves the purpose of automatically releasing the cam again from the spring-catch.

What I claim as new is—

1. The combination, with the spring-jaws A A, of the central shaft C provided with the teeth $h$, and the spring F provided with the catch $i$, substantially as and for the purpose specified.

2. The combination, with the spring-catch

F and sliding shaft C, of the cam G and pin k, as and for the purpose specified.

3. The combination, with the spring-jaws A A and head B, of the set-screws n n, for adjusting the angle of the spring-jaws, as described.

In witness whereof I have hereunto signed my name in the presence of two subscribing witnesses.

MELVIN JINCKS.

Witnesses:
 M. A. PECK,
 W. H. CHAPIN.